(No Model.)
W. W. NEWHALL.
FAUCET ATTACHMENT FOR DRAWING BEER, &c.
No. 552,771. Patented Jan. 7, 1896.
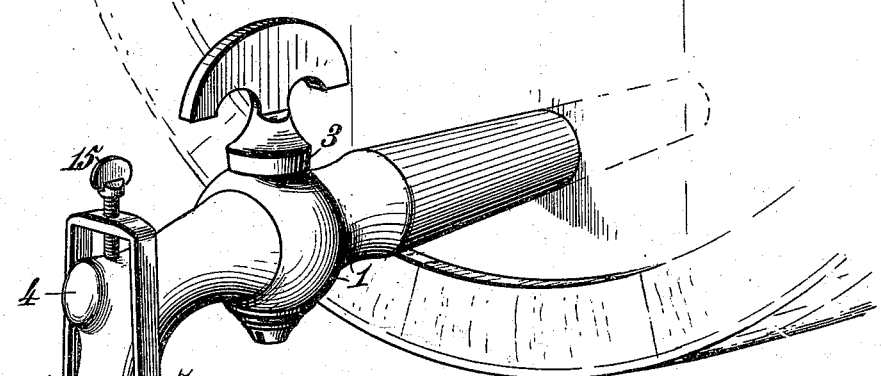
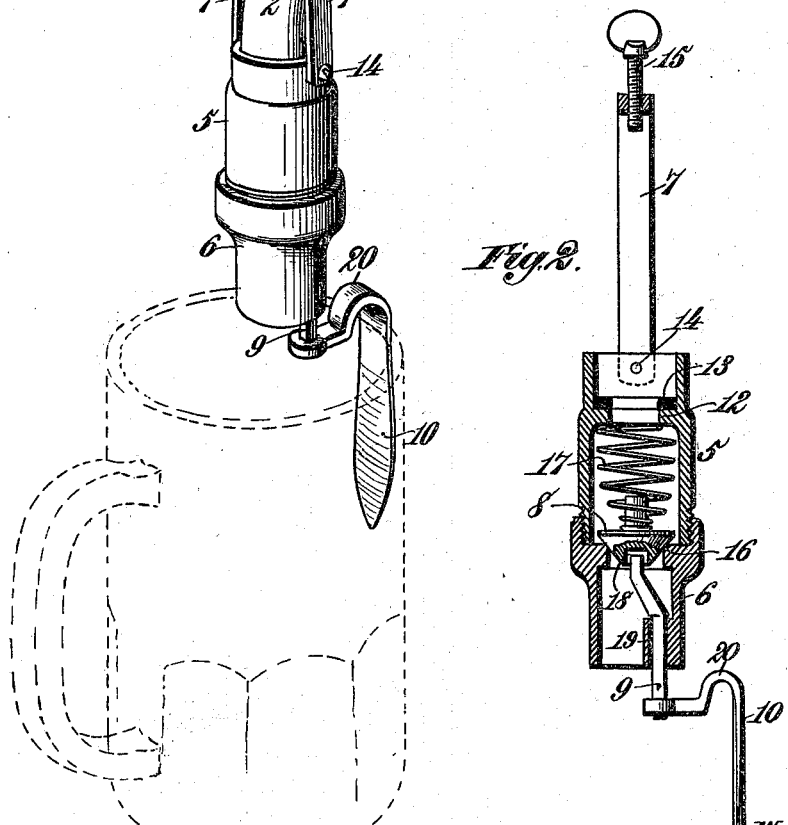
Witnesses.
Robert Everett.
Thos. A. Green
Inventor:
Walter W. Newhall.
By James L. Norris
Atty.

UNITED STATES PATENT OFFICE.

WALTER W. NEWHALL, OF COLUMBUS, OHIO, ASSIGNOR OF ONE-HALF TO ROBERT C. PARKER, OF SAME PLACE.

FAUCET ATTACHMENT FOR DRAWING BEER, &c.

SPECIFICATION forming part of Letters Patent No. 552,771, dated January 7, 1896.

Application filed April 1, 1895. Serial No. 544,040. (No model.)

*To all whom it may concern:*

Be it known that I, WALTER W. NEWHALL, a citizen of the United States, residing at Columbus, in the county of Franklin and State of Ohio, have invented new and useful Improvements in Faucet Attachments for Drawing Beer and other Liquids, of which the following is a specification.

This invention has for its object to provide a new and improved valved attachment designed to be removably mounted in operative connection with the delivery mouth or spout of any ordinary beer or other liquid-drawing faucet, whereby glasses of beer or other liquid can be rapidly drawn from a barrel, cask, keg, or other vessel by simply placing the glasses or receptacles one after another beneath the valved attachment and causing the edge of the glass or receptacle to act on or press against a rod or stem which acts to open the valve of the attachment and thereby permit the beer or other liquid to flow into the glasses or receptacles.

The invention also has for its object to provide a novel valved device which can be quickly attached to and removed from any ordinary faucet for drawing liquid from a barrel, cask, or keg, the construction being such that pressure of the receiving glass or receptacle opens the valve for the flow of the liquid into the glass or receptacle, whereby a person drawing beer or other liquid can hold several glasses or receptacles in each hand and cause them to act, one at a time, to open the valve, thus saving the time necessarily consumed in operating a faucet-valve by one hand while the other hand holds the glasses and largely reducing the loss of beer or other liquid incident to the same running to waste while a person picks up and places fresh glasses in position to receive the beer or liquid.

The invention also has for its object to provide a novel valved attachment of the character referred to wherein the valve-opening rod or stem is located wholly within the interior of the casing of the device, so that the only part projecting is the portion against which the glasses act to raise the valve from its seat and permit the flow of the beer or other liquid.

To accomplish all these objects my invention consists in the features of construction and in the combination of devices hereinafter described and claimed, reference being made to the accompanying drawings, in which—

Figure 1 is a perspective view showing my invention applied to an ordinary beer-faucet, and Fig. 2 is a detail vertical central sectional view of the improved valved attachment.

In order to enable those skilled in the art to make and use my invention, I will now describe the same in detail, referring to the drawings, wherein the numeral 1 indicates the body of an ordinary beer-faucet having a pendent discharge spout or mouth 2, a valve 3 for controlling the flow of liquid, and a knob or projection 4, which is utilized for driving the faucet into position in the barrel, cask, or keg.

The faucet illustrated in the drawings constitutes no essential part of my invention and is only typical of many different forms of faucets to which my improved removable and replaceable valved attachment can be applied, and therefore I do not wish to be understood as confining myself to any particular type of faucet.

The removable and replaceable valved attachment is composed essentially of a casing made in two or more sections 5 and 6, a support 7 for mounting the casing in operative connection with the mouth or spout of the faucet, a valve 8, normally held seated, a valve-operating rod or stem 9, and a glass-engaging arm 10.

The section 5 of the casing is provided internally with an annular flange or shoulder 12, arranged at some distance from the upper end of the section 5, and supporting a suitable packing-disk 13, designed to press against the edge of the delivery mouth or spout 2 of the faucet to make a tight connection therewith.

The support 7, as here shown, is in the form of a frame or yoke, comprising two approximately parallel arms or members, pivoted to the section 5 of the casing through the medium of pivots 14, preferably composed of screws which pass through the extremities of the arms of the frame or yoke and screw into the section 5 of the casing. The upper end of the frame or yoke is provided with a clamp, which, as here shown, is composed of a set-screw 15, passing through the frame or yoke and adapted to bear at its inner end against a part of the faucet when the yoke is arranged thereupon, whereby the section 5 of the casing can be clamped in operative connection with the delivery mouth or spout of the faucet.

The section 6 of the casing is screwed upon the lower end of the section 5 thereof, and is provided internally with a valve-seat 16, against which the valve 8 is normally held seated. The valve is made self-closing through the medium of a spring 17, interposed between the valve and the flange or shoulder 12. The valve is approximately conoidal, and at the center of its lower side it is constructed with a cavity or recess 18, into which projects the upper end of the rod or stem 9. The rod or stem is arranged within and guided by an eye or loop 19, formed on the inner surface of the section 6 of the casing in such manner that the rod or stem can be moved in a vertical plane, but will be held against axial rotation and displacement. To prevent axial rotation of the rod or stem, I construct the interior of the eye or loop angular in cross-section, and provide the rod or stem with an angular portion which fits the angular interior of the eye or loop.

The glass-engaging arm 10 is attached to or otherwise provided on the lower end of the rod or stem 9, and is constructed in juxtaposition to the rod or stem with an angularly-bent portion 20, adapted to be pressed upon by the edge of a glass or receptacle in such manner that the pressure exerted moves the rod or stem 9 upwardly and unseats the valve 8 to permit the flow of beer or other liquid through the valved attachment into the glass or receptacle, as will be obvious without further explanation. The valve 8 remains unseated as long as the pressure of the glass or receptacle is maintained against the angularly-bent portion 20 of the arm 10.

When the desired quantity of beer or liquid is within the glass, and the latter is removed from engagement with the arm 10, the valve 8 is automatically seated and the flow of beer or liquid ceases until the operation is repeated. By this means a person can hold several glasses or receptacles in each hand and successively place them in engagement with the arm 10 to unseat the valve and permit the flow of beer or other liquid. This saves the time which is ordinarily consumed in operating a faucet-valve by one hand while the other hand holds the glasses to be filled, and at the same time loss of beer or other liquid is reduced, in that little, if any, beer or other liquid runs to waste in shifting the glasses successively into engagement with the arm 10.

In my improved construction the valve and the valve-opening rod or stem are located entirely within the casing, so that the only part which projects to any extent is the glass-engaging arm 10, and this arm hangs approximately perpendicular, so that a very symmetrical faucet attachment is provided.

By my invention a bar-tender can fill any number of glasses which it is possible to hold at one time in both hands. When the beer is fresh it gives a better glass of beer with sufficient froth. There is little, if any, waste of beer, and the contrivance is very easily operated by simple pressure of a glass against the glass-engaging arm. The valve closes the instant the pressure is removed from the glass-engaging arm, so that much time is saved and loss of considerable beer is avoided.

By arranging the glass-engaging arm 10 in a plane approximately parallel with the line of motion of a valve-opening stem 9, located within the casing of the attachment, I provide a practical device, which is direct acting in operation, does not require leverage, which would be necessary if the valve-opening rod or stem were on the outside of the casing; there is little, if any, chance for leakage, the whole construction is compact and durable, and the device can be manufactured very economically and sold at a comparatively low price.

Having thus described my invention, what I claim is—

1. A valved faucet attachment for drawing beer, or other liquid, consisting of a casing composed of two detachably connected sections, one provided with a pivoted frame or yoke having a clamp for engaging an ordinary faucet, and the other provided with a valve-seat and an internal rod or stem guide, a valve adapted to seat upon the said valve-seat, a spring for normally holding the valve seated, a vertically sliding rod movable in said internal rod or stem guide and having its upper end unattached to and acting against the valve to unseat the same when the rod is raised, and a glass engaging device suspended from the lower end portion of the rod or stem, substantially as described.

2. A valved faucet attachment for drawing beer, or other liquid, consisting of a casing composed of two sections detachably screwed together, one of the sections having means to connect with a faucet, and the other having a valve-seat, and an internal eye or loop, a valve adapted to close against said valve seat, a spring for normally holding the valve seated, a vertically sliding rod or stem movable in the said internal eye or loop and adapted to unseat the valve, and a glass-engaging arm connected with the lower end of the rod or stem, substantially as described.

3. A valved faucet-attachment for drawing beer, or other liquid, consisting of a casing composed of two detachably-connected sections, one of which is provided with a valve-seat and an eye or loop, a self-closing valve normally held seated, a vertically-sliding rod or stem arranged in the eye or loop and adapted to unseat the valve, a glass-engaging arm connected with the lower end of the rod or stem, and a frame or yoke carried by the upper portion of the casing and having means for detachably connecting it with an ordinary faucet to secure the casing in operative
5 connection with the delivery mouth or spout thereof, substantially as described.

In testimony whereof I have hereunto set my hand and affixed my seal in presence of two subscribing witnesses.

WALTER W. NEWHALL. [L. S.]

Witnesses:
    L. L. RANKIN,
    C. P. L. BUTLER.